US012493958B2

(12) United States Patent
Dvey-Aharon et al.

(10) Patent No.: US 12,493,958 B2
(45) Date of Patent: Dec. 9, 2025

(54) METHOD AND SYSTEM FOR PREDICTING MANIFESTATION OR PROGRESSION OF A RETINAL MALADY AND METHOD FOR TRAINING MACHINE LEARNING (ML) MODELS FOR THE SAME

(71) Applicant: AEYE Health INC., New York, NY (US)

(72) Inventors: Zack Dvey-Aharon, Tel Aviv (IL); Danny Margalit, Ramat Gan (IL); Amit Wohl, Tel Aviv (IL); Yovel Rom, Tel Aviv (IL)

(73) Assignee: AEYE HEALTH, INC., New York, NY (US)

( * ) Notice: Subject to any disclaimer, the term of this patent is extended or adjusted under 35 U.S.C. 154(b) by 804 days.

(21) Appl. No.: 17/684,682

(22) Filed: Mar. 2, 2022

(65) Prior Publication Data

US 2023/0281816 A1 Sep. 7, 2023

(51) Int. Cl.
*G06K 9/00* (2022.01)
*A61B 3/14* (2006.01)
*G06T 7/00* (2017.01)
*G16H 50/20* (2018.01)

(52) U.S. Cl.
CPC ............ *G06T 7/0014* (2013.01); *A61B 3/145* (2013.01); *G16H 50/20* (2018.01); *G06T 2207/20081* (2013.01); *G06T 2207/30041* (2013.01)

(58) Field of Classification Search
CPC ........ G06T 7/0014; G06T 2207/20081; G06T 2207/30041; G06T 7/0012; A61B 3/145; A61B 3/12; A61B 3/0025; G16H 50/20; G16H 50/30; G16H 30/40; G16H 50/70; G06N 3/045; G06N 3/09
See application file for complete search history.

(56) References Cited

U.S. PATENT DOCUMENTS

2022/0375610 A1* 11/2022 Virmani .................. G16H 30/20

FOREIGN PATENT DOCUMENTS

| WO | WO-2020176039 A1 * | 9/2020 | ......... G06K 9/00617 |
| WO | WO-2022015895 A1 * | 1/2022 | ............. G16H 30/40 |

* cited by examiner

*Primary Examiner* — Xin Jia
(74) *Attorney, Agent, or Firm* — Rivka Friedman (57) ABSTRACT

A method for making a prediction regarding a malady in a retina of a subject, the method including: (a) receiving at least one retinal image of the retina; (b) calculating a prediction about the retina based on the at least one retinal image of the retina using at least one specialized machine learning (ML) model, the prediction pertaining to whether the malady will develop or manifest or progress in the retina within a time-period.

20 Claims, 7 Drawing Sheets

METHOD AND SYSTEM FOR PREDICTING MANIFESTATION OR PROGRESSION OF A RETINAL MALADY AND METHOD FOR TRAINING MACHINE LEARNING (ML) MODELS FOR THE SAME

FIELD OF THE INVENTION

The present invention relates to a machine learning models for predicting ailments and maladies and, more particularly, to a method and system for predicting the manifestation and/or development of a retinal malady related to an existing ailment in the body, using trained ML models.

BACKGROUND OF THE INVENTION

Diabetic retinopathy (DR) is the leading cause of vision loss and the most important ocular complication of diabetes mellitus. Major risk factors are duration of diabetes, chronic hyperglycemia, and hypertension. Chronic hyperglycemia leads to increased oxidative stress, inflammation, and hypoxia, all of which induce changes to the retinal neurovascular unit. Diabetic retinopathy (DR) is classified clinically into a severity scale based on the presence of microaneurysms, hemorrhages, and vascular changes, such as venous beading, intraretinal microvascular abnormalities (IRMA), or neovascularization.

SUMMARY OF THE INVENTION

According to the present invention there is provided method for making a prediction regarding a malady in a retina of a subject, the method including: (a) receiving at least one retinal image of the retina; (b) calculating a prediction about the retina based on the at least one retinal image of the retina using at least one specialized machine learning (ML) model, the prediction pertaining to whether the malady will develop or manifest or progress in the retina within a time-period.

According to further features each of the at least one specialized ML model was trained using a method comprising: (i) providing a pre-trained ML model; (ii) training the pre-trained ML on a uniquely ordered first set of retinal images to produce a trained ML model, wherein for each of the first set of images, providing a corresponding information item relating to a first predefined type, so as to be able to predict the corresponding information item of the predefined type for new retinal images; and (iii) training the trained ML model on a uniquely ordered second set of retinal images including images of healthy and pre-clinical retinas to produce the specialized ML model, wherein the specialized ML model is able to provide prediction data as to whether or not the at least one retinal image is indicative of the malady manifesting or progressing in the retina over the time-period.

According to still further features the method further includes providing at least one additional pre-trained ML model; training each of the at least one additional pre-trained ML model on the plurality of first retinal images, to produce at least one addition trained ML model, wherein the first retinal images are uniquely ordered for each of the at least one additional pre-trained ML model; and training each of the at least one additional trained ML model on the plurality of second retinal images to produce at least one additional specialized ML model.

According to still further features the method further includes training each of the single specialized ML model and the at least one additional specialized ML model on at least one additional ordered arrangement of the plurality of second retinal images to produce at least one additional specialized ML model per ordered arrangement.

According to still further features the method further includes training each of the single specialized ML model and the at least one additional specialized ML model on a unique pluralities (unique sets of images for each model) of the second retinal images to produce at least one additional specialized ML model per unique plurality.

According to still further features the method further including: providing at least one additional pre-trained ML model; training each of the at least one additional pre-trained ML model on a unique plurality of the first retinal images, to produce at least one addition trained ML model, wherein the first retinal images are uniquely ordered for each of the at least one trained ML model.

According to still further features the method further including providing at least one additional pre-trained ML model; training each of the at least one additional pre-trained ML model on the plurality of first retinal images and for each of the first retinal images providing a corresponding information item relating to a unique predefined type, so as to be able to predict the corresponding information item of the unique type for new retinal images.

According to still further features at least one specialized ML model was generated by training at least one pre-trained ML model on a set of retinal images including images of healthy and pre-clinical retinas such that the specialized ML model is able to provide prediction data as to whether or not the at least one retinal image is indicative of the malady manifesting or progressing in the retina over the time-period.

According to still further features the prediction is calculated from prediction data of each of the at least one specialized ML model.

According to still further features the at least one retinal image of the retina includes two or more retinal images of the retina; wherein the at least one specialized ML model provides prediction data for each of the two or more retinal images, and wherein the prediction data is combined to receive combined data on the retina, and wherein the prediction about the retina is based on the combined data.

According to still further features the method further including receiving at least one retinal image of a second retina of the subject; wherein the step of calculating a prediction about the retina is further based on the at least one retinal image of the second retina of the subject.

According to still further features the method further including calculating a prediction whether the subject will develop the malady based on prediction data from the retina and from the second retina.

According to still further features the malady has not manifested in the retina and the prediction pertains to whether the malady will manifest in the retina within a time-period. According to still further features a body of the subject is suffering from an ailment related to the malady. According to still further features a body of the subject is not suffering from an ailment related to the malady.

According to still further features the prediction pertains to whether the malady will not manifest, will manifest at a pre-clinical severity level, or will manifest at a clinical severity level within the time-period.

According to still further features the malady has manifested having a pre-clinical severity level and the prediction pertains to whether the malady will progress to a clinical severity level within a time-period or remain at the pre-clinical severity level.

According to still further features the healthy images include: (A) images of healthy retinas that will not develop the malady over the time-period, (B) images of healthy retinas that will develop a pre-clinical level of severity of the malady over the time-period, and (C) images of healthy retinas that will develop a clinical level of severity of the malady over the time-period; and wherein the pre-clinical images include: (D) images of pre-clinical retinas with the pre-clinical level of severity of the malady that will progress to the clinical level of severity of the malady over the time-period, and (E) images of preclinical retinas with the pre-clinical level of severity of the malady that will not progress to the clinical level of severity of the malady over the time-period; wherein the at least one specialized model is able to predict whether the retina will develop over the time-period the pre-clinical level of severity of the malady, the clinical level of severity of the malady or will not develop the malady.

According to other embodiments, there is provided a method for predicting manifestation or development of a malady in a malady-free retina, the method including: (a) receiving at least one retinal image of the malady-free retina; (b) calculating a prediction about the malady-free retina based on the at least one retinal image using a specialized machine learning (ML) model, the prediction pertaining to whether the malady-free retina will develop or manifest the malady within a time-period.

According to other embodiments, there is provided a method for predicting progression of a malady in a retina from pre-clinical to clinical, the method comprising: (a) receiving at least one retinal image of the retina having a pre-clinical malady; and (b) calculating a prediction about the retina based on the at least one retinal image using a specialized machine learning (ML) model, the prediction pertaining to whether the pre-clinical malady in the retina will progress to become a severe malady within a time-period.

According to other embodiments, there is provided a method for training machine learning (ML) models, the method comprising: (a) providing a single pre-trained ML model; (b) training the single pre-trained ML model on a plurality of first retinal images having a first order to produce a single trained ML model, for each of the first retinal images providing a corresponding information item relating to a first predefined type, so as to be able to predict the corresponding information item of the predefined type for new retinal images; (c) training the single trained ML model on a plurality of second retinal images including images of healthy and pre-clinical retinas, with regards to a predefined malady, to produce a specialized ML model able to provide prediction data as to whether the new retinal images of new retinas are indicative of the predefined malady manifesting or progressing in the new retinas over a given time-period.

According to still further features the method further includes providing at least one additional pre-trained ML model; training each of the at least one additional pre-trained ML model on the plurality of first retinal images, to produce at least one addition trained ML model, wherein the first retinal images are uniquely ordered for each of the at least one additional pre-trained ML model; and training each of the at least one additional trained ML model on the plurality of second retinal images to produce at least one additional specialized ML model.

According to still further features the method further including: training each of the single specialized ML model and the at least one additional specialized ML model on at least one additional ordered arrangement of the plurality of second retinal images to produce at least one additional specialized ML model per ordered arrangement.

According to still further features the method further including: training each of the single specialized ML model and the at least one additional specialized ML model on a unique pluralities of the second retinal images to produce at least one additional specialized ML model per unique plurality.

According to still further features the method further including providing at least one additional pre-trained ML model; training each of the at least one additional pre-trained ML model on a unique plurality of the first retinal images, to produce at least one addition trained ML model, wherein the first retinal images are uniquely ordered for each of the at least one.

According to still further features the method further including providing at least one additional pre-trained ML model; training each of the at least one additional pre-trained ML model on the plurality of first retinal images and for each of the first retinal images providing a corresponding information item relating to a unique predefined type, so as to be able to predict the corresponding information item of the unique type for new retinal images.

According to still further features the healthy images include: (i) images of healthy retinas that will not develop a predefined malady over a given time-period, (ii) images of healthy retinas that will develop a pre-clinical level of severity of the predefined malady over the given time-period, and (iii) images of healthy retinas that will develop a clinical level of severity of the predefined malady over the given time-period; and wherein the pre-clinical images include: (iv) images of preclinical retinas with the pre-clinical level of severity of the predefined malady that will progress to the clinical level of severity of the predefined malady over the given time-period, and (v) images of preclinical retinas with the pre-clinical level of severity of the predefined malady that will not progress to the clinical level of severity of the predefined malady over the given time-period; wherein the model(s), after the training on the first plurality of images and the second plurality of images are able to predict whether the retina will develop over the given period of time a pre-clinical level of the predefined malady, a clinical level of the predefined malady or will not develop the predefined malady.

According to still further features the predefined malady is Diabetic Retinopathy (DR). According to still further features the at least one retinal image of the retina include multiple images of retinas from different angles. According to still further features the images in the plurality of first retinal images and the plurality of the second retinal images are stochastically ordered.

According to other embodiments, there is provided a method for predicting manifestation or development of an ailment in a body of a subject, the method including: (a) receiving at least one retinal image of a retina of the subject; and (b) calculating a prediction about the body based on the at least one retinal image using a specialized machine learning (ML) model, the prediction pertaining to whether the body of the subject will develop or manifest the ailment within a given time-period.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a method and system for predicting a retinal malady according to the present invention may be better understood with reference to the drawings and the accompanying description.

In general, the instant disclosure is directed to the examination of one or more retinal images of a patient to predict the manifestation, development, and/or progression of a malady in the retina and/or a related ailment in the body of the patient.

The instant disclosure further relates to a method and system for training machine learning (ML) models to predict the development of various maladies in retinas. The term "malady" is used herein to relate to an abnormality of the retina that is indicative of an illness and/or is itself detrimental to the wellbeing of the patient. The malady may be referring to any retinal malady or may be referring to a specific malady (i.e., training the ML model to detect or predict that a malady will develop, without knowing what kind of malady, or training the model to detect or predict the development of a specific malady).

It is noted that the presence of a malady or structural changes that are a precursor to the development or manifestation of a malady in the retina may inform the presence of a related ailment within the body and/or the relative severity of the ailment in the body. The opposite may also be true, i.e., the presence of an ailment in the body may inform the likelihood and/or severity of a related malady in the retina. It is also true that an ailment may be detected from the retina even though the retina may be considered by a retina specialist to be healthy. For example, authors have developed a system to detect diabetes (a systemic ailment) from a retina that was determined by retina specialists to be healthy—i.e. retina that is free from diabetic retinopathy.
Three Types of Images Accordingly, it is possible to collect retinal images (the terms "image" and "retinal image" and their grammatical variations are used herein interchangeably, unless specifically stated otherwise) that fall into three general categories, for the purpose of training the ML models. The first and third categories are relatively easy to define: the first category is for images of healthy retinas; and the third category is for images of retinas with a malady. One embodiment of the instant method and system relates specifically to training ML models on images that fall into a second category. The second category is for images of retinas of patients having an ailment that is related to the malady for which the ML models are trained to provide a prediction for. According to an alternative method of classification, there are 4 categories—(i) retinas devoid of malady, (ii) retinas with malady, (iii) retinas from subjects with an ailment, (iv) retinas of subjects without ailment. The ailment may or may not cause a malady in the retina. For example, the ailment diabetes will likely cause diabetic retinopathy to develop. The ailment osteoporosis is not known to cause any maladies in the retina.

The instant methods and systems allow for predicting the manifestation or progression of a malady in the retina. It is possible to train an ML model using images of heathy retinas coming from subjects with and/or without ailment. The system further affords predicting the manifestation (not progression) of an ailment from images of healthy retinas or retinas with maladies coming from subjects that are devoid of the ailment being predicted.

The first type of retinal image (or category of images) pertains to a retinal image of a healthy retina. The retina may be considered healthy by being devoid of any retinal malady. According to some embodiments, the definition of a healthy retina further necessitates that the body of the patient (besides for the retina) is also devoid of an(y) ailment that is related to retinal maladies or a specific retinal malady. In other embodiments, healthy retinas may belong to patients that have an ailment, and even an ailment that in due time will cause a malady in the retina. According to some embodiments of the method and system, the ML models are trained on these types of images. According to other embodiments, the ML models are not trained on these types of images.

The decision to categorize an image as pertaining to one type or another type is, or may be, relevant with respect to a period of time only. That is to say that if we give the example of the period of time (hereafter also "time-period") being equal to one year, then an image may be categorized as belonging to the first type, i.e., healthy image or image of a healthy retina, if the retina imaged on day one is devoid of the malady and the same retina is imaged one year later and is still devoid of the malady.

It is noted that there may not necessarily be a second image taken after the time-period. Instead, a determination of being healthy (or not healthy, whatever the reality is) may be made by a medical practitioner and simply noted in medical file. This information is attached or related to the first image. Accordingly, the image has at least two data points: (1) a diagnosis of the retina as imaged; and (2) a diagnosis of the same retina after the time-period.

The second category has five clearly distinct types of images (any image in this category that does not fit exactly into one of the types is associated with the closest type). These different types are summarized in Table 1 below. In all embodiments, the ML models are trained on images that belong to the second category.

In some embodiments of the method and system only one retina per patient is imaged or that images of both retinas of the same patient are not associated with each other. In other embodiments, both retinas are imaged, and the information associated with each of the images includes at least a reference to images of the other retina. These alternative embodiments relate to all the types of images of retinas discussed herein.

One type of retinal image pertains to images of retinas that are devoid of the malady, and it is known that the same retina does not develop the malady within a time-period (and this information is provided together with the image). I.e., the same patient, after the time-period, does not develop the malady in the retina.

A second type of image pertains to images of retinas that are devoid of the malady, but it is known that the same retinas developed the malady within a time-period (and this information is provided together with the image). I.e., the same patient, after a period of time, actually develops or manifests the malady in the retina. The latter presence of the malady in the same retina informs the type of image as belonging to the second type of image in the second category. If the malady has a threshold distinguishing between a pre-clinical level of severity of the malady and a clinical level of severity of the malady, then this type of image pertains to retinas that develop the malady at a level of severity above the threshold.

In some embodiments, images of the retina after the time-period are provided for the training of the ML model and related to the images of the same retina before the time-period elapsed. In other embodiments, this information may be provided without accompanying images.

A third type of image in the second category pertains to images of retinas that are devoid of the malady, but it is known (and this information is associated with the image) that the same retinas developed the malady within the time-period, but at a level of severity that is below the threshold.

A fourth type of image in the second category pertains to images of retinas that present the malady, but at a level of severity that is below a threshold. Further, it is known that the same retina remained at the level of severity that is below the threshold, after the time-period lapsed. A fifth type of image in the second category pertains to images of retinas that present the malady at a level of severity that is below a threshold. It is further known that the level of severity increased after the time-period to a level that is above the threshold.

The third category, as mentioned, is of retinas that suffer from the, or a, malady. According to embodiments, the third category may require a degree of severity, i.e., that the level of severity of the malady is above a threshold. In some embodiments, the ML models are trained on images from the third category.

TABLE 1

| | Initial image | Image after time-period elapse | Ailment in body |
|---|---|---|---|
| First type Healthy | Clear | Clear | No |
| Second type Preclinical | Clear | Clear | Yes |
| | Clear | Evident below threshold | Yes |
| | Clear | Evident below threshold | Yes |
| | Evident below threshold | Evident below threshold | Yes |
| | Evident below threshold | Evident below threshold | Yes |
| Third type Clinical | Evident below threshold | Evident below threshold | Yes |

The terms "clinical" and "pre-clinical" and grammatical variations thereof are used herein to distinguish between levels of severity of affliction of the retina by the malady. The distinction between pre-clinical (or "preclinical") and clinical is that the level of severity is either below a threshold (pre-clinical) or above the threshold (clinical). The threshold may be a given or constant value/score. Alternatively, the threshold may be a relative value or score that is calculated by taking into account the relative values of various variables.

Embodiment 1

Figure 1:
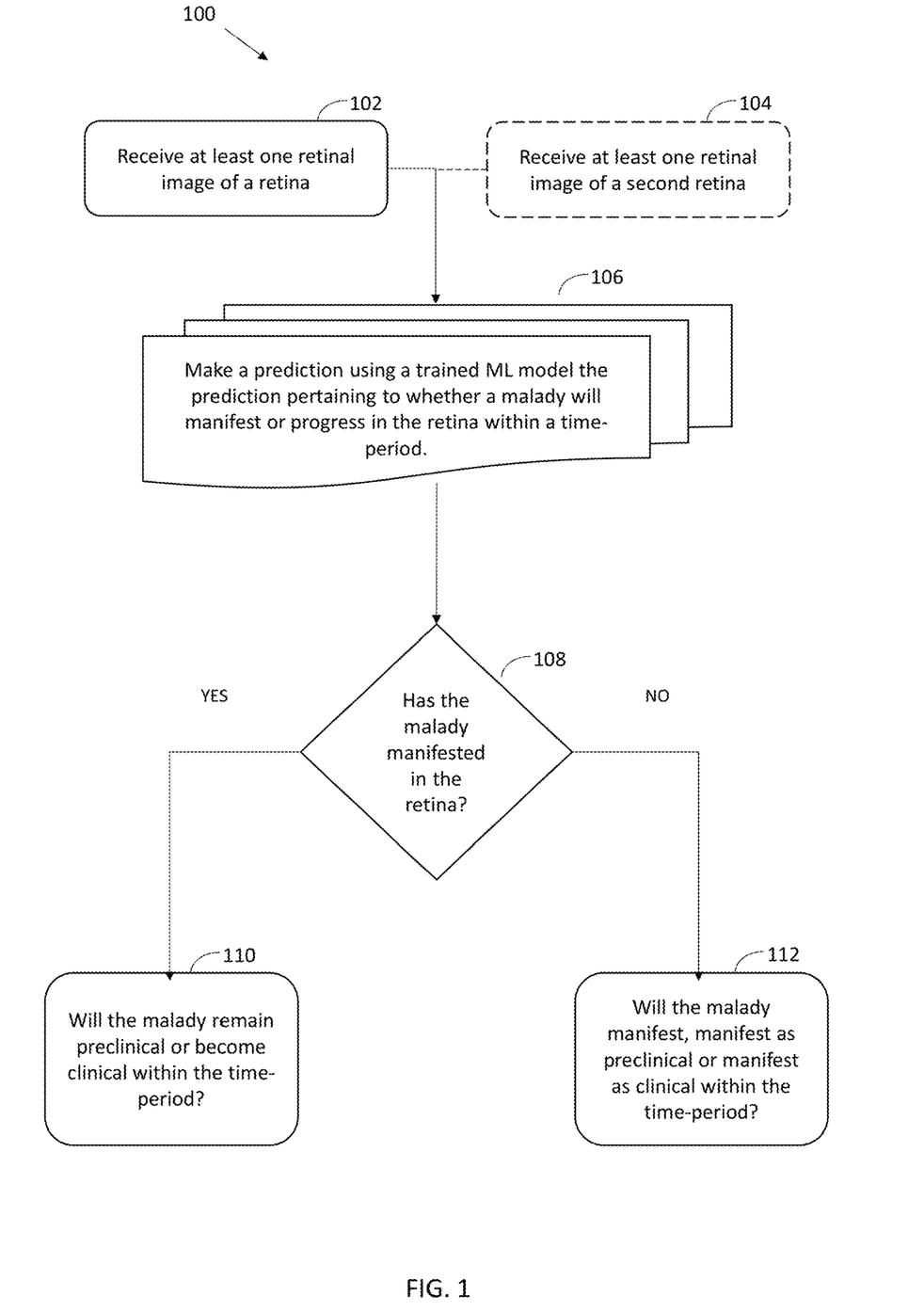
FIG. 1 is a flow diagram 100 of the method for making a prediction regarding a malady in a retina based on retinal images.

Referring now to the drawings, FIG. 1 illustrates a flow diagram 100 of the method for making a prediction regarding a malady in a retina based on retinal images. The subject/patient in the instant embodiment/scenario suffers from an ailment that is related to the malady in question. The subject may be a human or animal. Accordingly, there is an effort to determine if and/or in what way the malady will manifest in the retina. One example, that is not intended to be limiting in any way, is the ailment of diabetes. One of the effects of diabetes is diabetic retinopathy. According to the example, the ailment in the method is diabetes and the malady is diabetic retinopathy. This example is relevant to all of the embodiments detailed herein.

The method starts at step 102 where at least one retinal image of the retina is received. It may be sufficient to provide a single image of the retina. Or, said another way, if only one image of the retina is available/provided, the system will still be able to make the prediction. It is noted that the more data points available to the system, the higher the likelihood of an accurate prediction. Two or more retinal images of the retina (e.g., from different angles) also fulfill this function. Information from the one, two or more retinal images is combined to receive compound data on the retina.

In embodiments, an optional step 104 includes receiving one or more retinal images of the second retina of the same person or subject. Block 104 is shown in broken line to indicate that the step is optional.

In step 106 the system makes a prediction about the retina based on the (one, two or more) retinal image(s) using a trained machine learning (ML) model. In embodiments, predictions are made on multiple models, one prediction per model. The prediction pertains to whether the malady develops and/or manifests and/or progresses in the retina within a time-period. The time-period may be preset, selected or otherwise determined. The prediction may be based on the image(s) and/or information from and/or related to the image(s).

In embodiments where two or more images of the retina are provided, information from the images is combined and the prediction is based on the compound data. In embodiments wherein images of two retinas are provided, the prediction is based on the combined information from images of both retinas and making the prediction on the basis of the combined data.

In step 108, it is determined or known whether the malady has manifested in the retina at a pre-clinical level or not manifested at all. In some embodiments the ML model classifies whether the malady has manifested in the retina in the image. In other embodiments it has been pre-determined (e.g., by a medical professional) whether the malady has manifested or not. This pertain to either one retina or both retinas.

In some scenarios, the malady has not manifested in the retina and, in step 110 the prediction pertains to whether the malady will manifest in the retina within a time-period. More specifically, at step 110, the prediction pertains to whether, within the time-period, the malady with will either not manifest at all (at least not in a way discernable at least by a human practitioner), will manifest at a pre-clinical severity level, or will manifest at a clinical severity level. In other scenarios, at step 112, the malady has manifested in one or both retinas at a pre-clinical level. The prediction at step 112 pertains to whether the malady will continue to remain at the pre-clinical level or will progress to the clinical level within the time-period.

As mentioned, the distinction between pre-clinical and clinical depends on many factors, some objective and some may even be subjective. For example, with regards to diabetic retinopathy, a shift from perfused capillary density (PCD) elevation to progressive decline suggests a meaningful inflection or "tipping point" which may have value as a preclinical biomarker of diabetic microvascular disease, signaling that normal compensatory responses have become overwhelmed just prior to the appearance of clinically visible lesions. Exceeding this threshold is important not only for vision loss, but for other systemic complications as well. Retinal capillary beds are particularly vulnerable, showing signs of diabetic microvascular disease early due to their high metabolic demands. Though less easily recognized, other end-organs are likely not far behind.

Embodiment 2

Figure 2:
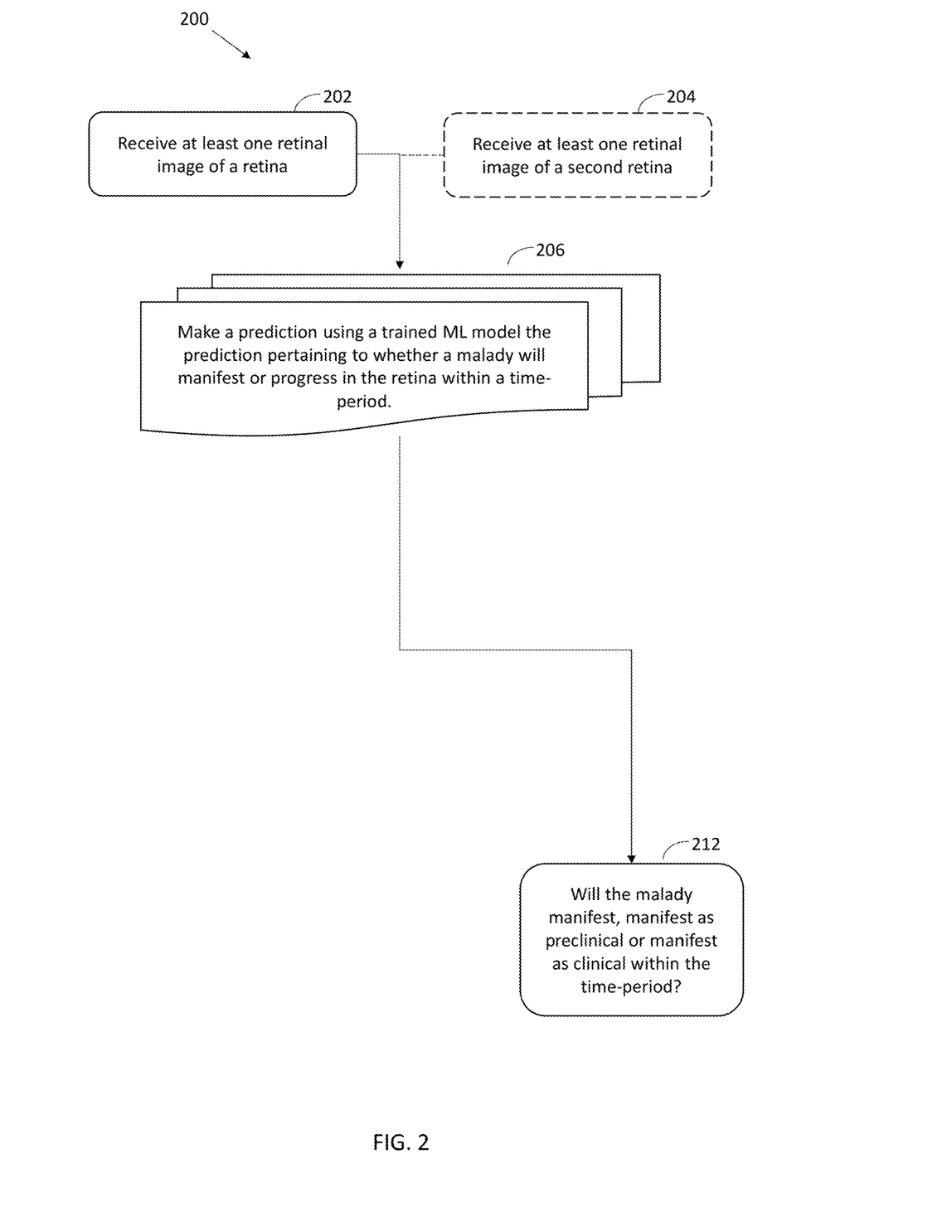
FIG. 2 is a flow diagram 200 of the method for making a prediction regarding a retina based on retinal images according to another embodiment.

FIG. 2 illustrates a flow diagram 200 of the method for making a prediction regarding a retina based on retinal images. Specifically, the predicting relates to the manifestation or development of a malady in a malady-free retina. The subject/patient in the instant embodiment/scenario suffers from an ailment that is related to the malady in question. The subject may be a human or animal. Accordingly, there is an effort to determine if and/or in what way the malady will manifest in the retina.

The method starts at step 202 where at least one retinal image of the retina is received. It may be sufficient to provide a single image of the retina. Or, said another way, if only one image of the retina is available/provided, the system will still be able to make the prediction. It is noted that the more data points available to the system, the higher the likelihood of an accurate prediction. Two or more retinal images of the retina (e.g., from different angles) also fulfill this function. Information from the one, two or more retinal images is combined to receive compound data about the retina.

In embodiments, an optional step 204 includes receiving one or more retinal images of the second retina of the same person or subject. Block 104 in the diagram is depicted with a broken line to indicate that the step is optional. Information from both retinas is used to improve the prediction of the manifestation, development, and/or progression of the malady in one or both of the retinas.

In step 206 the system makes a prediction about the malady-free retina based on the (one, two or more) retinal image(s) using a trained machine learning (ML) model. In embodiments, predictions are made on multiple models, one prediction per model. The prediction pertains to whether the malady develops and/or manifests and/or progresses in the retina within a time-period. The time-period may be preset, selected or otherwise determined. The prediction may be based on the image(s) and/or information from and/or related to the image(s).

In embodiments where two or more images of the retina are provided, information from the images is combined and the prediction is based on the compound data. In embodiments wherein images of two retinas are provided, the prediction is based on the combined information from images of both retinas and making the prediction on the basis of the combined data.

In step 210 the prediction pertains to whether the malady will manifest in the retina within a time-period. More specifically, at step 210, the prediction pertains to whether, within the time-period, the malady with will either not manifest at all (at least not in a way discernable at least by a human practitioner), will manifest at a pre-clinical severity level, or will manifest at a clinical severity level.

Embodiment 3

Figure 3:
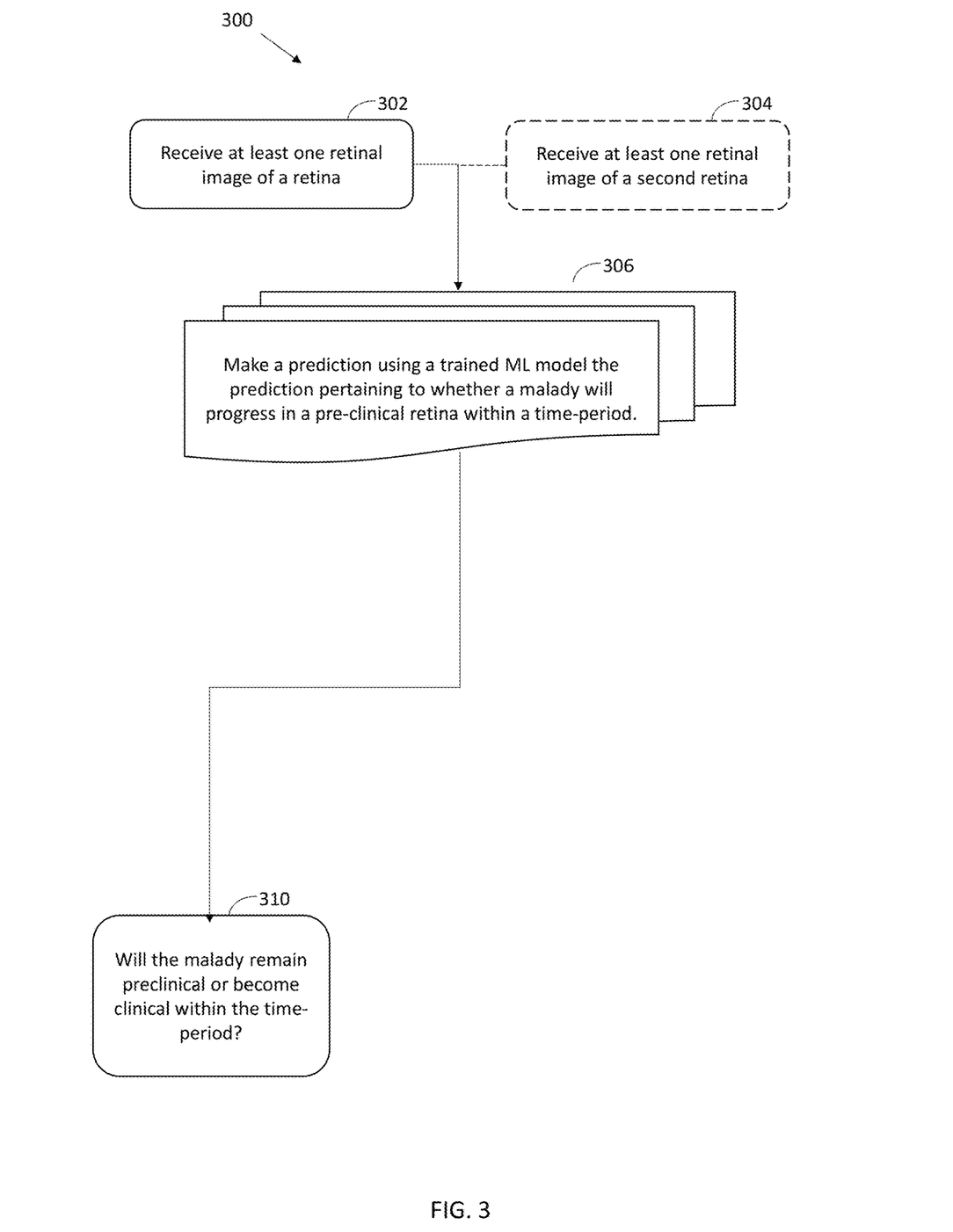
FIG. 3 is a flow diagram 300 of the method for making a prediction regarding a retina based on retinal images according to yet another embodiment.

FIG. 3 illustrates a flow diagram 300 of the method for making a prediction regarding a retina based on retinal images. Specifically, the predicting relates to the progression (i.e., whether or not it will increase in severity) of a malady in a retina from a pre-clinical level of severity to a clinical level of severity. The subject/patient in the instant embodiment/scenario suffers from an ailment that is related to the malady in question. The subject may be a human or animal. Accordingly, there is an effort to determine if and/or in what way the malady will progress/worsen in the retina.

The method starts at step 302 where at least one retinal image of the retina is received. It may be sufficient to provide a single image of the retina. Or, said another way, if only one image of the retina is available/provided, the system will still be able to make the prediction. It is noted that the more data points available to the system, the higher the likelihood of an accurate prediction. Two or more retinal images of the retina (e.g., from different angles) also fulfill this function. Information from the one, two or more retinal images is combined to receive compound data about the retina.

In embodiments, an optional step 304 includes receiving one or more retinal images of the second retina of the same person or subject. Block 304 in the diagram is depicted with a broken line to indicate that the step is optional. Information from both retinas is used to improve the prediction of the progression of the malady in one or both retinas.

In step 306 the system makes a prediction about the retina having a pre-clinical degree of the malady based on the (one or more) retinal image(s) using a trained machine learning (ML) model. In embodiments, predictions are made on multiple models, one prediction per model. The prediction pertains to whether the malady progresses/worsens from a pre-clinical level to a clinical level in the retina within a time-period, or not. The time-period may be preset, selected or otherwise determined. The prediction may be based on the image(s) and/or information from and/or related to the image(s).

In embodiments where two or more images of the retina are provided, information from the images is combined and the prediction is based on the compound data. In embodiments wherein images of two retinas are provided, the prediction is based on the combined information from images of both retinas and making the prediction on the basis of the combined data.

At step 312, the malady has manifested in one or both retinas at a pre-clinical level. The prediction at step 312 pertains to whether the malady will continue to remain at the pre-clinical level or will progress to the clinical level within the time-period.

Embodiment 4

Figure 4:
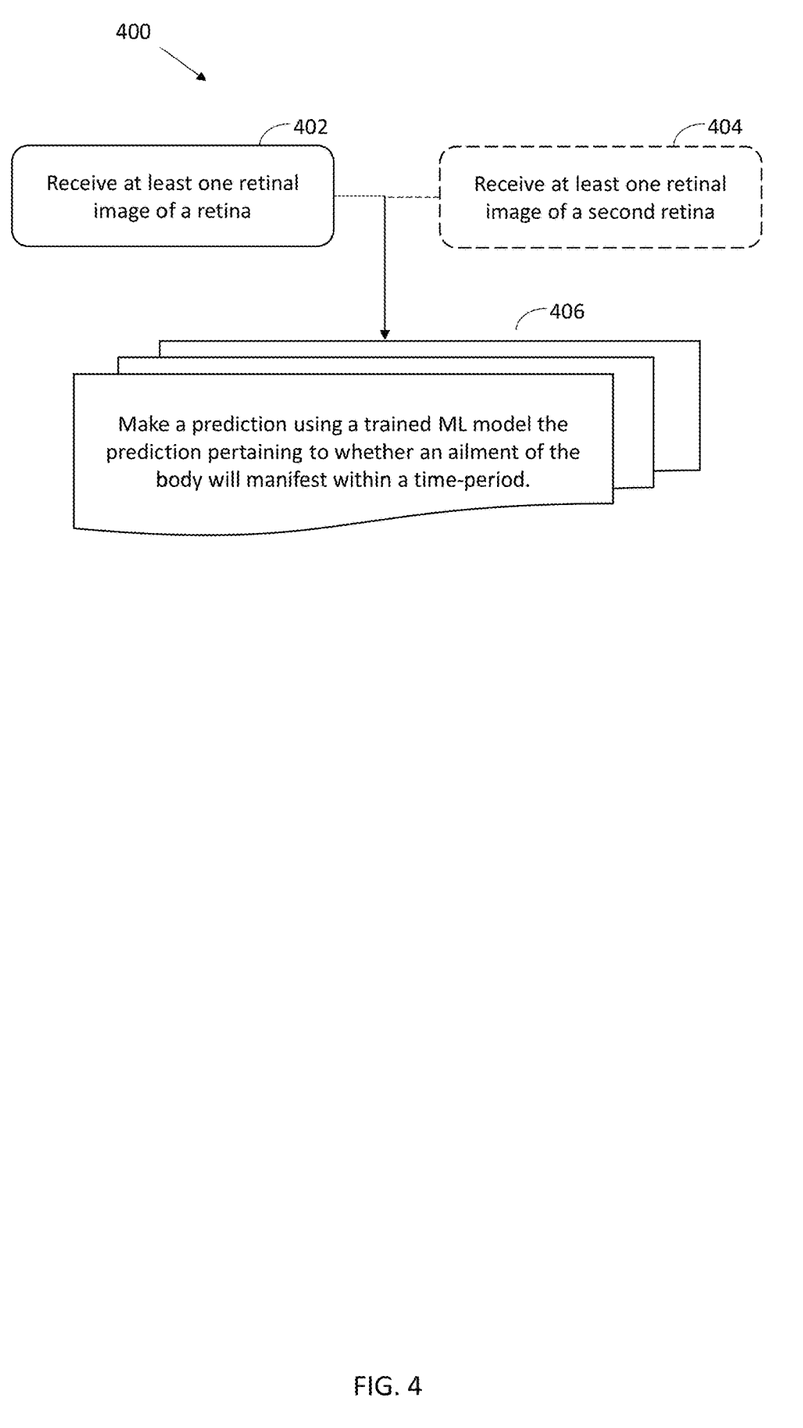
FIG. 4 is a flow diagram 400 of a method for making a prediction regarding the development of an ailment in the body of a subject.

FIG. 4 is a flow diagram 400 of a method for making a prediction regarding the development of an ailment in the body of a subject. At step 402 the system receives or captures one or more images of a retina of the subject. The subject may be a human or animal. The retinal image or images belong to the first category of images discussed above.

In embodiments, an optional step 404 includes receiving one or more retinal images of the second retina of the same person or subject. Block 104 is shown in broken line to indicate that the step is optional.

At step 406 a prediction is made regarding whether or not an ailment will manifest, develop, and/or progress in the subject. In embodiments, predictions are made on multiple models, one prediction per model. In some embodiments there is a malady of the retina that is related to the ailment in the body of the subject. In embodiments, the prediction of the manifestation of the malady is a prediction of the manifestation of the ailment in the body. In embodiments, the prediction is not related to the manifestation of the malady in the retina. In embodiments, there is no malady of the retina that is related to the ailment, rather the detection of various artifacts in the image(s) of the retina serves to provide the prediction.

In step 406 the system makes a prediction about the retina based on the (one or more) retinal image(s) using a trained machine learning (ML) model. The prediction pertains to whether the ailment develops and/or manifests and/or progresses in the body within a time-period. The time-period may be preset, selected or otherwise determined. The prediction may be based on the image(s) and/or information from and/or related to the image(s).

In embodiments where two or more images of the retina are provided, information from the images is combined and the prediction is based on the compound data. In embodiments wherein images of two retinas are provided, the prediction is based on the combined information from images of both retinas and making the prediction on the basis of the combined data.

With regards to the prediction steps 106, 206, 306 and 406 described above, training of the ML model or models is described and detailed hereafter.

Figure 5:
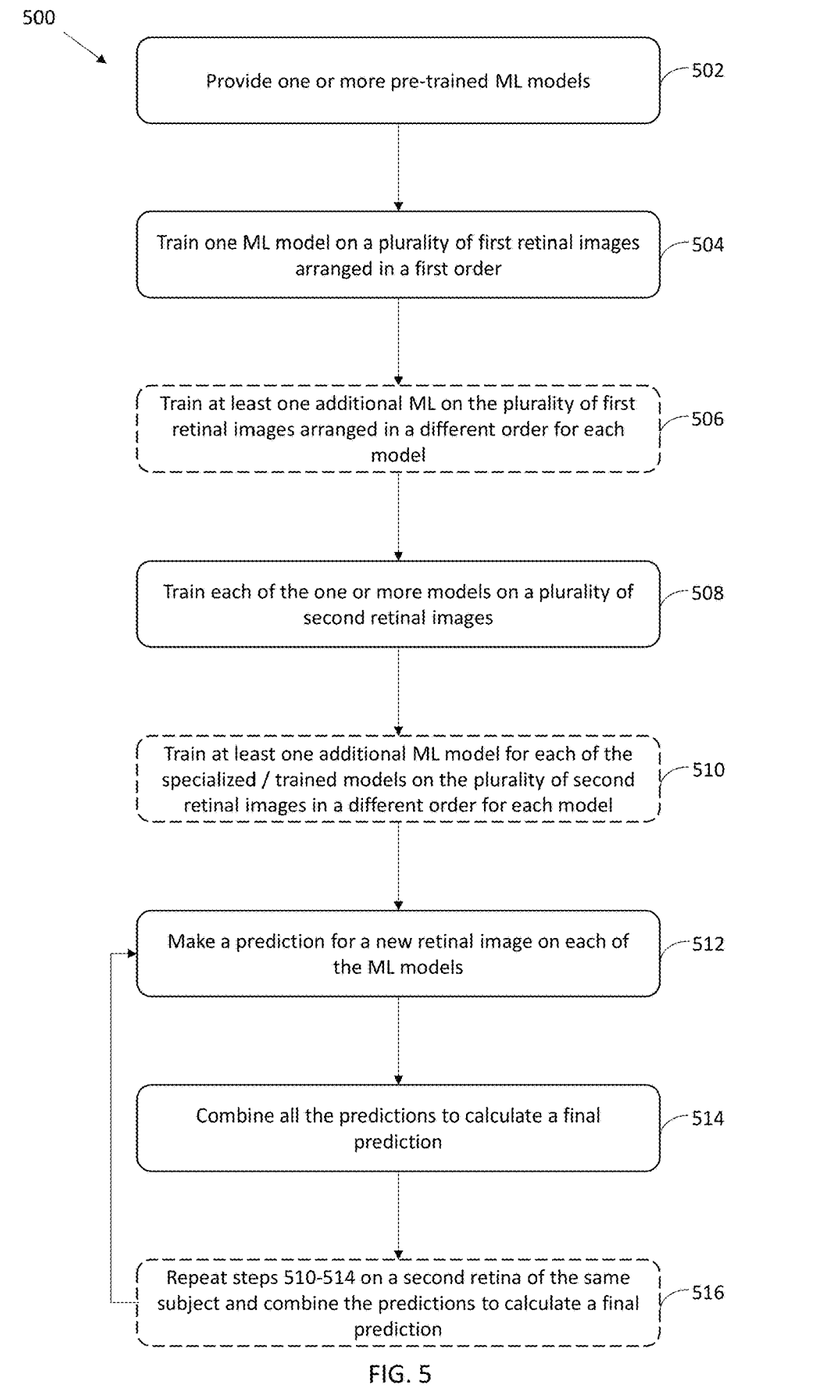
FIG. 5 is a flow diagram 500 of the process for training a ML model.

FIG. 5 is a flow diagram 500 of the process for training a ML model. It is made clear that any type of machine learning model may be used. The term "machine learning (ML)" and grammatical variations thereof is intended to convey method of machine learning known in the art (e.g., artificial intelligence (AI), deep learning, neural networks, etc.) and/or combinations thereof. One example embodiment of the machine learning model is a Convolution Neural Networks (CNN). The instant example is not intended to limit the method or system in any rather it is merely intended to portray one way of implementing the method and/or system.

In step 502 a plurality of models is provided. These models are pre-trained ML models. Such models can be procured from sources such as ImageNet (https://www.image-net.org). ImageNet is an image dataset organized according to the WordNet hierarchy. Each meaningful concept in WordNet, possibly described by multiple words or word phrases, is called a "synonym set" or "synset". There are more than 100,000 synsets in WordNet; the majority of them are nouns (80,000+). In ImageNet, we aim to provide on average 1000 images to illustrate each synset. Images of each concept are quality-controlled and human-annotated.

In Machine Learning and Deep Neural Networks, machines are trained on a vast dataset of various images. Machines are required to learn useful features from these training images. Once learned, they can use these features to classify images and perform many other tasks associated with computer vision.

In step 504 a first model of the plurality of pre-trained ML models is trained on a first plurality of retinal images arranged in a first order. Each of the first plurality of images is provided with a corresponding information item relating to a first predefined type. For example, all the retinal images are provided with the ages ('predefined type') of the subjects whose retinas were imaged. For each of the images, the specific age ('information item') is provided together with or associated with the image. The model is trained (or specialized) on the plurality of images in order to be able to predict the corresponding information item of the predefined type (e.g., the age of the person/retina) for a new retinal image for which this information is not provided. Models trained on the first set of retinal images are referred to herein as "trained models" or "task-trained models".

In embodiments, the process has an optional step in which the process will be repeated using the same dataset (i.e., the same set of images) but these images will be arranged in a different way to the first model. The same will be true for any additional model that is trained. The purpose of rearranging the images is so that the model learns in a different way. Each time the model is trained of a sub-set of images (e.g., 30 images) the model changes. With the next set of 30 images, the model changes again. This happens over and over again until all of the images have been learned. The plurality of images (i.e., the entire set of images) may be 10,000 images or more or less. Therefore, when the order is different the model has developed in a different way.

In optional step 506 at least one additional model of the plurality of pre-trained ML models is trained. Each of the at least one additional model is trained on the same set of images ('first plurality of retinal images' or 'plurality of first images' or 'plurality of task-training images'). The difference is that for each new/additional model the order of the images is different (as discussed below, there are other options, such as additionally or alternatively the task may be different and/or the images may be different). Said another way, the order of images for each additional model is different to the first order of images (and different to each other model). The images, for each model, are stochastically ordered, making the order for each model unique. As with the first model, a corresponding information item, relating to a first predefined type, is provided for each image. Each new model is trained to be able to predict that corresponding information item of the predefined type (e.g., age) for a new retinal image.

In step 508 the same models that were trained on the first information type (e.g., to be able to predict age, or gender etc.) are now further trained in a specialization. Each of the models is trained on a second plurality of retinal images. These models are referred to herein as specialized ML models. This plurality of images is from the second category of retinal images discussed above. The images pertain to subjects that have an ailment that is related to a malady that may or may not be present in the retina. The images are of either healthy retinas (i.e., devoid of the malady, or at least the malady is undetectable at least to a human practitioner), or retinas that present a pre-clinical level of severity of the malady. The difference between pre-clinical and clinical, as understood in the present disclosure, is discussed above.

There are three possible types of healthy images:
(i) images of healthy retinas that will not develop a predefined malady over a given time-period, (ii) images of healthy retinas that will develop a preclinical level of severity of the predefined malady over the given time-period, and (iii) images of healthy retinas that will develop a clinical level of severity of the predefined malady over the given time-period.

There are two types of pre-clinical images:

(iv) images of pre-clinical retinas, i.e., retinas with a pre-clinical level of severity of the predefined malady that will progress to having a clinical level of severity of the predefined malady over the given time-period, and (iv) images of pre-clinical retinas, i.e., retinas with a pre-clinical level of severity of the predefined malady that will not progress to the clinical level of severity of the predefined malady over the given time-period but will rather stay pre-clinical.

For the specialization, the images have relevant information attached or associated with the images. The relevant information includes at least a categorization of the retina at the time the image was captured (i.e., healthy or pre-clinical) and information regarding what happened to those retinas over or after the given time-period. The images foretell or foreshadow what will happen to that retina over time. The system uses machine learning to train the models recognize these patterns or indicators that are common to images of the different types, so even though a human practitioner may never be able to accurately predict what will happen over time, the ML models will (to a certain degree of accuracy).

Said another way, the models, after training on the first plurality of images and the second plurality of images, are able to predict whether the imaged retina will develop (over the given time-period) a pre-clinical level of the predefined malady, a clinical level of the predefined malady or will not develop the predefined malady at all.

An example of the above process can be a case where three pre-trained ML models are provided (the pre-trained models may be duplicates, alternatively they may be trained on the same set of images but in different orders, or they may be trained on three separate sets of images). The three pre-trained or benchmarked ML models are then trained on one feature of retinal images, resulting in three trained ML models. In other embodiments, each of the 3 pre-trained ML models may be used to train multiple new trained ML models. For example, each of the 3 pre-trained models may be trained 3 times (or used to train three new trained models). The result is 9 trained models.

In embodiments, the pre-trained models are trained on the plurality of first images, where the order of the images is changed for each model. In other embodiments, a different set (a different plurality) of 'first' images or 'task-training images' is used to train the models on a specific task (i.e., all models are trained to perform the same task, such as prediction of age, or prediction of gender, etc.). In yet other embodiments, the first/task-training images may be same but in a different order and/or each model is trained on a different task. In yet other embodiments, the images may be the same or different, if the same images are used then the order is different, and/or the task may be different or the same.

The method may further include a step 512 of making a prediction, regarding the new retinal image, using each of the models to return a respective value. For example, if nine (9) models where initially trained, at steps 504 and 506, and each of the 9 models is further trained to specialize, then the new retinal image is run against each of the 9 specialized models to receive a prediction. In embodiments, each of the 9 predictions comes with a score or percentage of likelihood (predication data) that the prediction is correct. A value reflecting the level of certainty that the prediction is correct. At step 514 the system now takes these 9 resulting values or scores and combines all the values together and provides a calculated score or prediction for the retina from the 9 models. In some embodiments, the training or task-training steps are skipped, and the pre-trained models are directly specialized. For example, multiple images of the same retina may be run on specialized models that were not trained on a task and still return surprising and excellent results.

An optional step 510 includes training each model more than once on the second set of images, and each time, rearranging the order of the images (as was done with the first set of images). So, using the above example of nine trained models, each of these trained models can be used to generate a new group of specialized models. E.g., each trained model is trained three times to create three new specialized models for each trained model, resulting in twenty-seven (27) distinct, specialized models. Continuing the example, at step 512, each new retinal image is run on 27 specialized ML models, each of which returns a prediction with a value of certainty (prediction data). The values are then combined in some way and a final prediction is made by making a calculation on the combined results from the 27 models.

As with the training or task-training there may be more than one way to train the models in the specialized manner. In embodiments, the pre-trained models (and in some embodiments even pre-trained models) are trained on the plurality of second images (or 'malady-relevant images'), where the order of the images is changed for each model. In other embodiments, a different set (a different plurality) of 'second' images or 'malady-relevant images' is used to train the models (pre-trained or trained) to predict manifestation and/or progression of the malady (and in some embodiments an ailment in the body of the subject).

In yet another optional step 516, a second retina of the same subject is imaged and the new retinal image (or images) goes through the same prediction process of steps 510-514. A prediction can also be made for the subject based on the prediction data for each of the retinas. The data can either be combined and the prediction made on the basis of the combined data or the prediction can be made on the basis of the worse of the two retinas.

One example embodiment of the predefined malady is Diabetic Retinopathy (DR). Retinal images of the first or second plurality of retinal images may include multiple images of the same retinas from different angles. The images in the first set of images are stochastically ordered.

Diabetic retinopathy (DR) is a common retinal vascular complication of diabetes mellitus, which is characterized by microaneurisms, hemorrhages, neovascularization, and edema in the retina. Diabetic retinopathy can advance to blindness, and is the leading cause of vision-loss at the working age. While over 80% of diabetics develop retinopathy of some degree after 20 years, more than 90% of the sight-threatening cases can be treated, if found early, in time to prevent loss of sight.

Current public health guidelines for individuals with diabetes prescribe annual or bi-annual screening for the presence of DR. Multiple clinical studies have demonstrated that screening can lead to early detection and timely treatment which ultimately can prevent blindness. While retinal screening is essential for patients with diabetes, it requires a specialized eye exam which is often inaccessible for patients. A large percentages of individuals with diabetes forego screening retinal exams and present late in the course of the disease. Early intervention is the key to mitigation of DR risk factors and damage. As such, early detection is the most promising way of mitigating the damages of DR.

More recently, AI and machine learning have been applied, with success, to the autonomous diagnosis of referable (more than mild) DR. There is an FDA approved AI system with sensitivity of 87% and specificity of 90%. More recently, our team reported results of a Pivotal FDA study with 93% sensitivity and 91% specificity for referable DR on images obtained by a desktop device and 92% and 94% sensitivity and specificity, respectively, on images obtained by a portable camera. Additionally, our team published strong efficacy for DR detection using a portable camera on a separate dataset.

While diabetic retinopathy can be diagnosed by physicians and machine learning systems, there have been no reliable prognostic models to predict DR conversion to date. Some work has been done on finding risk factors for DR, using patient data such as age, HbA1c levels, gender, duration of disease, and so on.

Recent work has shown that otherwise normal fundus images can be quite informative and predictive when presented to a machine learning algorithm. AI algorithms can interpret subclinical information of the fundus image and make predictions about diseases, even those unrelated to the eye—such as chronic kidney disease (CKD), diabetes, and cardiac arrest. Furthermore, machine learning algorithms have been trained to predict gender information with high accuracy from mere fundus photography—something previously unattainable with the standard clinical exam.

There is disclosed herein a first-in-class machine learning algorithm which can predict the development of future DR from otherwise normal retinal anatomy.

Method

Dataset

The research utilized a dataset compiled and provided by EyePACS (http://www.eyepacs.org), comprised of fundus retinal images and expert readings of said images. The data consisted of 156,363 images from 21,730 patients who visited the clinics at least twice between 2016 and 2021. 19.6% of visit pairs were ≤12 months apart, 55% were 12-24 months apart, 19.8% were 24-36 months apart, and 5.5% of visits were ≥36 months apart. Of the patients, 37% were male and 63% were female or other; mean age was 55 years old (for full demographic data see Table 2).

The dataset contained up to 6 images per patient visit: one macula centered image, one disk centered image, and one center image, per eye. Each eye was graded individually by an expert ophthalmologist for the presence and severity of diabetic retinopathy (DR). DR severity (none, mild, moderate, severe, or proliferative) was graded according to the International Clinical Diabetic Retinopathy scale.

The image categorization in the current research was simplified to three severity categories by combining categories 3 to 5 into "more-than-mild DR", as only these levels usually necessitate referral to an ophthalmologist and/or medical and surgical management.

TABLE 2

Describes key characteristics of the dataset. The patients were designated randomly to the training set and the validation set.

|  | Training set | Validation set |
| --- | --- | --- |
| Number of patients | 19,531 | 2,199 |
| Number of images | 140,614 | 15,749 |
| Age: mean, years (s.d.) | 55.15 (10.68), n = 19495 | 55.34 (10.40), n = 2195 |
| Gender (% male) | 0.37, n = 19102 | 0.37, n = 2155 |
| HbA1c: mean, % (s.d.) | 7.98 (2.26), n = 15672 | 7.99 (2.75), n = 1756 |
| Disease duration: mean, years (s.d.) | 7.46 (6.44), n = 18803 | 7.21 (6.20), n = 2108 |

TABLE 2-continued

Describes key characteristics of the dataset. The patients were designated randomly to the training set and the validation set.

|  | Training set | Validation set |
| --- | --- | --- |
| Ethnicity | 62.1% Latin American, 11.4% ethnicity not specified, 9.1% African Descent, 7.4% Caucasian, 5.4% Asian, 2.8% Indian subcontinent origin, 1.1% Other, n = 19076 | 61.4% Latin American, 10.7% ethnicity not specified, 9.7% African Descent, 7.8% Caucasian, 5.6% Asian, 3.1% Indian subcontinent origin, 1.1% Other, n = 2147 |

In order to prepare the dataset for model training and validation, each image was labeled by the maximal DR rating the patient was diagnosed with in a time period following the visit. Towards this purpose each patient visit was rated twice on the DR scale, once for each of the patient's two eyes. Pairs were then created consisting of all possible pairings of each patient's visits in a given time period. Values of the pairings were calculated by measuring the difference in DR ratings, and then taking the maximum value. Each time point (visit) was then assigned the highest value from the pairings in which that timepoint was the first, and each image was labeled by that value. Negative differences were disregarded, as the regression cause was unknown: true disease regression, clinical intervention, or misdiagnosis. Models were created for each of the chosen time periods.

For instance, a given patient (P) has visited a clinic n times, once a year: v1, v2, . . . , vn. The cutoff for the given time period is set at two years, resulting in the following n−1 data points: v1 compared to v2 and v3 (taking the maximal difference), v2 compared to v3 and v4 (taking the maximal difference), etc. Further models using this patient's data are also created, set at different time periods (three years, four years, and so on).

There were two reasons for choosing the maximal difference as the label. Firstly, the main clinical value is in predicting whether a patient will develop DR, not in which eye it will be. Secondly, correlation found between the maximal right and left eye differences was relatively high (0.5), which indicates that difference between the eyes may well be incidental.

Algorithm Development

To evaluate the models' performance, a random 10% of the patients were designated as the validation set and not used for the training of models. Given that this same 10% were used as the validation set across tasks, this choice made the fair comparison of different models and timeframes easier.

In order to train the model, all the datapoints representing a progression were included, and a subset of the negative datapoints were included at a ratio of 2:1.

Models were trained on four different tasks:
Progression amongst DR patients (mild to more-than-mild)
Prediction of DR development (normal to any DR)
Prediction of clinically significant DR (from non-referable to referable DR)
General progression (progress): any change for the worse in the DR condition The hyper-parameters for the model training were chosen beforehand, and not changed, to prevent over-fitting.

Results

Transition Results

The calculated/resulting baseline transition odds between different DR levels are displayed in Table 3. This is observational data, as regression- and progression-related factors are unknown; regression may have been caused by clinical intervention, and progression may be understated due to patients who were blinded and therefore did not return for subsequent visits.

TABLE 3

Disease progression was calculated between any given visit and the visit immediately following. "Regression" is defined as the patient's recorded DR level being lower on the second visit, "No change" is defined as recorded DR levels being the same between visits, and "Progression" is defined as DR levels being higher.

| Initial DR level | | 0 | 1 | 2 | 3 | 4 |
|---|---|---|---|---|---|---|
| Year 1 | Regression | — | 0.413 | 0.328 | 0.35 | 0.119 |
| | No Change | 0.921 | 0.38 | 0.613 | 0.567 | 0.881 |
| | Progression | 0.079 | 0.208 | 0.059 | 0.084 | — |
| Year 2 | Regression | — | 0.383 | 0.307 | 0.461 | 0.159 |
| | No Change | 0.895 | 0.328 | 0.596 | 0.34 | 0.841 |
| | Progression | 0.105 | 0.288 | 0.097 | 0.198 | — |
| Year 3 | Regression | — | 0.423 | 0.285 | 0.424 | 0.105 |
| | No Change | 0.872 | 0.303 | 0.624 | 0.364 | 0.895 |
| | Progression | 0.128 | 0.274 | 0.091 | 0.212 | — |

Prediction Results

The model's performance in determining the risk of mild DR becoming more-than-mild DR is comparable to risk factor-based prediction (area under the receiver operating curve (AUC) 0.65 vs. 0.66, respectively). For the other tasks more images were available, and performance improved significantly. The results improved still by using multiple images per patient and averaging the resulting score. The model scored best on the task of prediction of clinically significant DR, with the aggregated score resulting in AUC 0.81 (CI 95% 0.77-0.84) (see Table 4).

TABLE 4

The models' score, in AUC, in predicting DR within two years. In the parentheses 95% CI.

| | Image | Patient | HbA1c | Disease Duration |
|---|---|---|---|---|
| Mild DR to mtmDR | 0.63 (0.59, 0.67) | 0.65 (0.57, 0.73) | 0.66 (0.62, 0.71) | 0.50 (0.46, 0.54) |
| No DR to mtmDR | 0.67 (0.65, 0.68) | 0.71 (0.68, 0.74) | 0.65 (0.63, 0.67) | 0.60 (0.59, 0.62) |
| mtmDR− to mtmDR+ | 0.75 (0.73, 0.76) | 0.81 (0.77, 0.84) | 0.70 (0.68, 0.72) | 0.63 (0.62, 0.65) |
| Any DR Progression | 0.70 (0.69, 0.72) | 0.75 (0.72, 0.78) | 0.67 (0.66, 0.69) | 0.61 (0.60, 0.62) |

Figure 6:
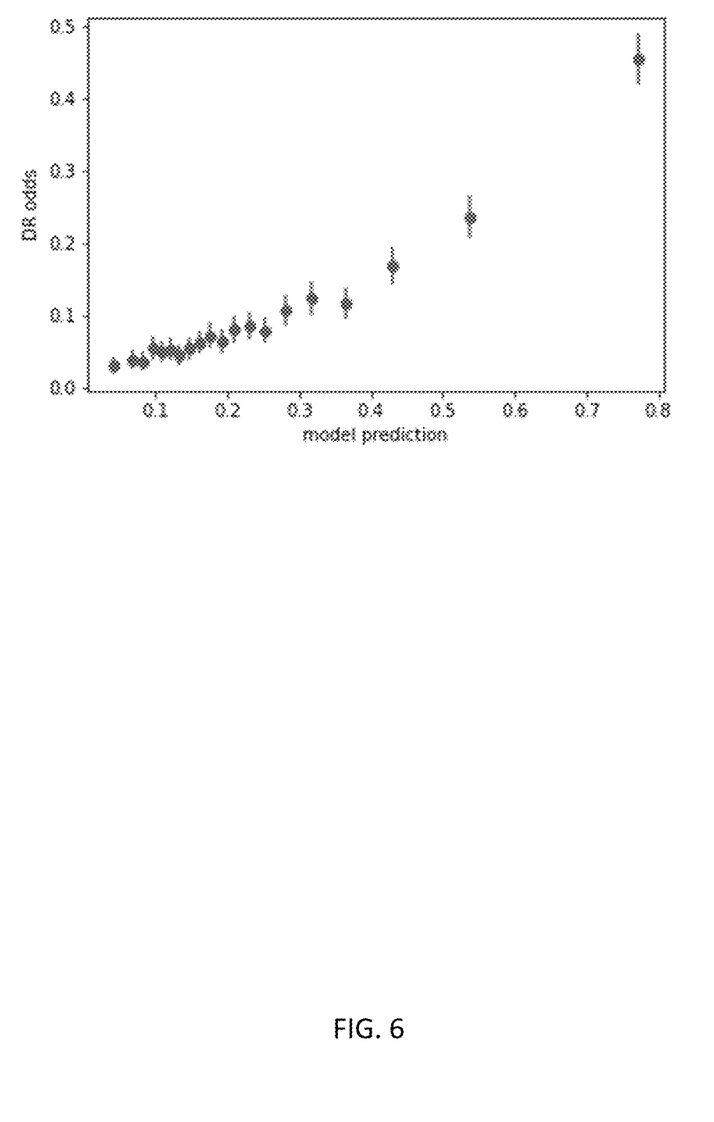
FIG. 6 is a graph charting the odds of the patient from a representative sample being diagnosed with clinically significant DR in two years, as a function of the model's score

To further analyze the model's prediction value in that task, the empirical risk as a function of the model's score was investigated (see FIG. 6). FIG. 6 depicts a graph charting the odds of the patient from a representative sample being diagnosed with clinically significant DR in two years, as a function of the model's score. Each dot represents 5% of the patients. When the model was trained to predict the transition to more-than-mild DR, the top 5% patients highest scored by the model were at 46% risk of getting DR, while the baseline odds in the validation set were 10%—almost a 5-fold increase.

Figure 7:
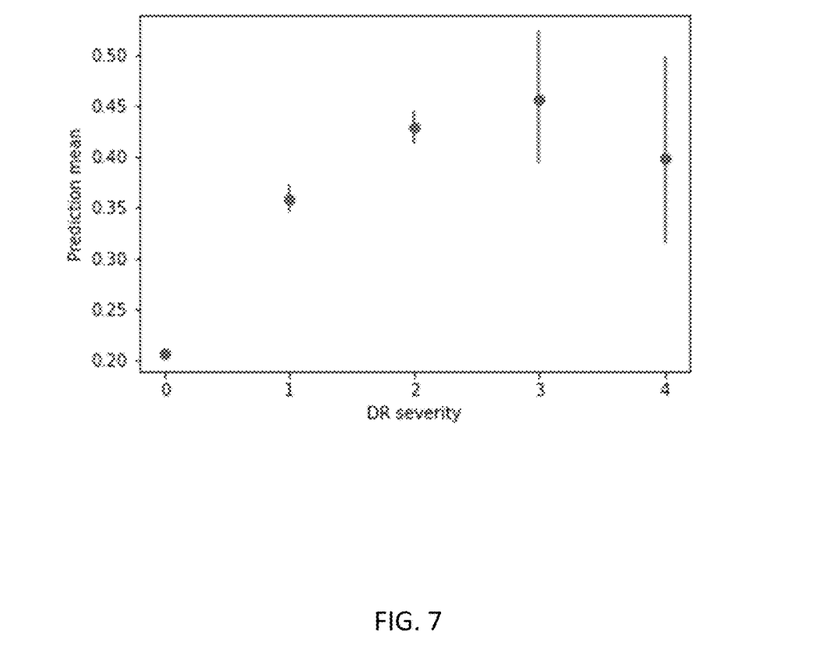
FIG. 7 is a graph of the model's score as a function of the final diagnosed severity of the DR.

In order to analyze the relation between the model's assigned scores and the severity of developed DR, the scores assigned by the model were averaged and compared across different subgroups; normal patients who were diagnosed with DR up to two years after initial images were taken were sorted into subgroups based on DR severity. The groups of mild, moderate, and severe DR were score averaged at 0.36, 0.43, and 0.46 respectively (see FIG. 7). FIG. 7 depicts a graph of the model's score as a function of the final diagnosed severity of the DR. The model is more confident of the future occurrence of DR if it's more severe.

Figure 8:
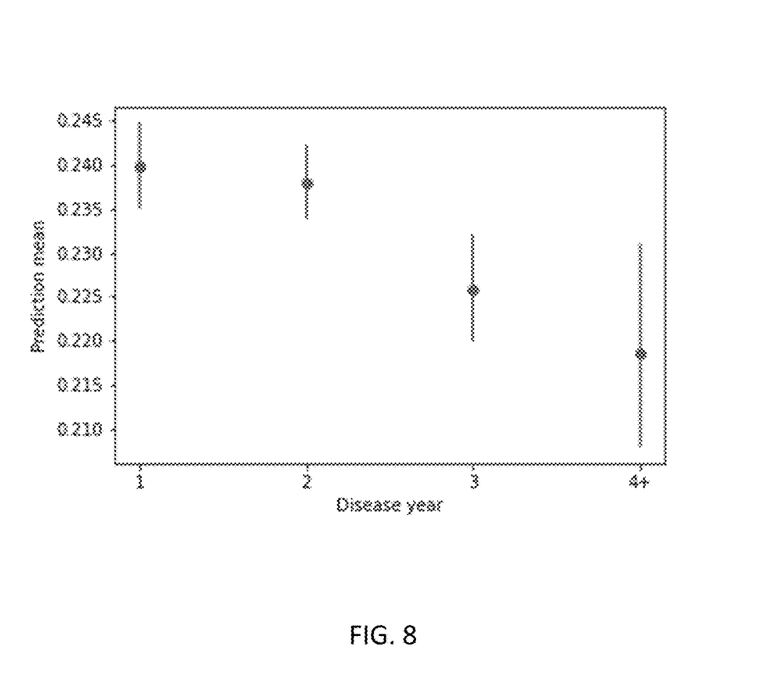
FIG. 8 is a graph of the model's mean score as a function of how many years after the visit DR was diagnosed.

Additionally, the model's predictive effectiveness regarding the more rapid development of DR was analyzed. Assigned scores were averaged and compared across subgroups organized by time elapsed between initial imaging and diagnosis: one, two, three, and four or more years. It was hypothesized that the healthier the eye appeared the more time would elapse between initial imaging and diagnosis. As expected, the model's score declined in congruence with time passed before diagnosis (see FIG. 8). FIG. 8 depicts a graph of the model's mean score as a function of how many years after the visit DR was diagnosed. As expected, model average score decreases in accordance with time elapsed between first visit and diagnosis.

The aim of this research was to develop a method of predicting the chances of future development of DR, before detection methods can even be applied. Given the extremely high prevalence of DR, the difficulty in permanently reversing retinal damage, and current patient non-compliance, prevention and not only treatment of DR is crucial to health outcomes. As such, prediction of individual DR risk may become a key element. Currently, to the best of our knowledge, the only methods of doing so are risk factor based and are of limited predictive clinical utility.

The current research was conducted using convolutional neural networks, a standard state of the art computer vision algorithm. Such algorithms have been reliably incorporated in multiple medical fields, such as ophthalmology, radiology, endocrinology, and others. The algorithms presented in this work, which are easily implemented and display excellent performance, may carry widespread implications related to better DR prediction. For instance, given the knowledge that some patients are at very low risk of developing DR, screening may be able to be feasibly reduced according to individual risk levels, reducing strain placed on both patients and medical staff. Furthermore, in high-risk cases which have not yet manifested, patients may be forewarned of impending risk, increasing chances of mitigation and prevention through diabetes management.

A lack of patient education regarding the risks of diabetes, and DR specifically, has been cited as a contributing factor in patient non-compliance. Furthermore, patients may not attend screenings due to belief that they do not require retinal examinations or treatment as their vision is too good, or their diabetes is too mild to be relevant. The ability to concretely discuss personal risk levels with the patient may do much to mitigate these beliefs, contributing to higher compliance. Improved patient compliance in terms of DR may also improve compliance in terms of general diabetes management, bettering patient outcomes across the board.

One limitation of the current research is that the transition odds are observatory, rather than experimental. As such, there is the possibility of an under-statement of risk, given that blinded people likely did not continue to return for checkups. Odds of regression may similarly be over-stated, as regression factors are unknown and regression may have been caused by surgical or medical intervention.

Recommendations for future research include studies on how to incorporate the model into usual diabetes standards of care, in order to better mitigate and prevent DR. There may be added value in including metadata on levels of previously recognized risk factors among patients in order to improve predictive value. Additionally, there is great value in examining whether use of this algorithm does, in fact, improve patient compliance. This model may also contribute to future research of DR risk factors and prevention, as at-risk patients with previously unknown risk factors may become recognizable, allowing for a more holistic understanding of contributing influences, both biological and behavioral.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for making a prediction regarding a malady in a retina of a subject, the method comprising:
    (a) receiving at least one retinal image of the retina;
    (b) calculating a prediction about the retina based on said at least one retinal image of the retina using at least one specialized machine learning (ML) model, said prediction pertaining to whether the malady will develop or manifest or progress in the retina within a time-period, wherein each of said at least one specialized ML model was trained using a method comprising:
    (i) providing a pre-trained ML model;
    (ii) training said pre-trained ML on a uniquely ordered first set of retinal images to produce a trained ML model, wherein for each of said first set of images, providing a corresponding information item relating to a first predefined type, so as to be able to predict said corresponding information item of said predefined type for new retinal images; and
    (iii) training said trained ML model on a uniquely ordered second set of retinal images including images of healthy and pre-clinical retinas to produce said specialized ML model,
    wherein said specialized ML model is able to provide prediction data as to whether or not said at least one retinal image is indicative of the malady manifesting or progressing in the retina over said time-period.

2. The method of claim 1, further comprising:
    providing at least one additional pre-trained ML model;
    training each of said at least one additional pre-trained ML model on said plurality of first retinal images, to produce at least one addition trained ML model, wherein said first retinal images are uniquely ordered for each of said at least one additional pre-trained ML model; and
    training each of said at least one additional trained ML model on said plurality of second retinal images to produce at least one additional specialized ML model.

3. The method of claim 2, wherein said prediction is calculated from prediction data of each of said at least one specialized ML model.

4. The method of claim 2, further comprising:
    training each of said single specialized ML model and said at least one additional specialized ML model on at least one additional ordered arrangement of said plurality of second retinal images to produce at least one additional specialized ML model per ordered arrangement.

5. The method of claim 2, further comprising:
    training each of said single specialized ML model and said at least one additional specialized ML model on a unique pluralities of said second retinal images to produce at least one additional specialized ML model per unique plurality.

6. The method of claim 1, further comprising:
    providing at least one additional pre-trained ML model;
    training each of said at least one additional pre-trained ML model on said plurality of first retinal images and for each of said first retinal images providing a corresponding information item relating to a unique predefined type, so as to be able to predict said corresponding information item of said unique type for new retinal images.

7. The method of claim 1, wherein said at least one specialized ML model was generated by training at least one pre-trained ML model on a set of retinal images including images of healthy and pre-clinical retinas such that said specialized ML model is able to provide prediction data as to whether or not said at least one retinal image is indicative of the malady manifesting or progressing in the retina over said time-period.

8. The method of claim 1, wherein said at least one retinal image of the retina includes two or more retinal images of the retina;
    wherein said at least one specialized ML model provides prediction data for each of said two or more retinal images, and
    wherein said prediction data is combined to receive combined data on the retina, and wherein said prediction about the retina is based on said combined data.

9. The method of claim 1, further comprising:
    receiving at least one retinal image of a second retina of the subject;
    wherein said step of calculating a prediction about the retina is further based on said at least one retinal image of said second retina of the subject.

10. The method of claim 9, further comprising calculating a prediction whether the subject will develop the malady based on prediction data from the retina and from said second retina.

11. The method of claim 1, wherein the malady has not manifested in the retina and said prediction pertains to whether the malady will manifest in the retina within a time-period.

12. The method of claim 11, wherein a body of the subject is suffering from an ailment related to the malady.

13. The method of claim 12, further comprising:
    providing at least one additional pre-trained ML model;
    training each of said at least one additional pre-trained ML model on a unique plurality of said first retinal images, to produce at least one addition trained ML model, wherein said first retinal images are uniquely ordered for each of said at least one trained ML model.

14. The method of claim 11, wherein a body of the subject is not suffering from an ailment related to the malady.

15. The method of claim 11, wherein the prediction pertains to whether the malady will not manifest, will manifest at a pre-clinical severity level, or will manifest at a clinical severity level within said time-period.

16. The method of claim 1, wherein the malady has manifested having a pre-clinical severity level and the prediction pertains to whether the malady will progress to a clinical severity level within a time-period or remain at said pre-clinical severity level.

17. The method of any one of claim 1 or 2, wherein said healthy images include:
  (A) images of healthy retinas that will not develop the malady over the time-period,
  (B) images of healthy retinas that will develop a pre-clinical level of severity of the malady over said time-period, and
  (C) images of healthy retinas that will develop a clinical level of severity of the malady over said time-period; and
  wherein said pre-clinical images include:
  (D) images of pre-clinical retinas with said pre-clinical level of severity of the malady that will progress to said clinical level of severity of the malady over said time-period, and
  (E) images of preclinical retinas with said pre-clinical level of severity of the malady that will not progress to said clinical level of severity of the malady over said time-period;
  wherein said at least one specialized model is able to predict whether the retina will develop over said time-period said pre-clinical level of severity of the malady, said clinical level of severity of the malady or will not develop the malady.

18. A method for predicting progression of a malady in a retina, the method comprising:
  (a) receiving at least one retinal image of the retina where no malady is detected;
  (b) calculating a prediction about the retina based on said at least one retinal image using a specialized machine learning (ML) model, said prediction pertaining to whether a malady will progress in the retina within a time-period;
  wherein each of said at least one specialized ML model was trained using a method comprising:
  (i) providing a pre-trained ML model;
  (ii) training said pre-trained ML on a uniquely ordered first set of retinal images to produce a trained ML model, wherein for each of said first set of images, providing a corresponding information item relating to a first predefined type, so as to be able to predict said corresponding information item of said predefined type for new retinal images; and
  (iii) training said trained ML model on a uniquely ordered second set of retinal images including images of healthy and pre-clinical retinas to produce said specialized ML model,
  wherein said specialized ML model is able to provide prediction data as to whether or not said at least one retinal image is indicative of the malady manifesting or progressing in the retina over said time-period.

19. The method of claim 18, wherein a malady is detected in the at least one retinal image of the retina; and
  wherein said prediction pertains to whether said detected malady in the retina will progress in its clinical severity within a time-period.

20. A method for predicting manifestation or development of an ailment in a body of a subject, the method comprising:
  (a) receiving at least one retinal image of a retina of the subject; and
  (b) calculating a prediction about the body based on said at least one retinal image using a specialized machine learning (ML) model, said prediction pertaining to whether the body of the subject will develop or manifest the ailment within a given time-period;
  wherein each of said at least one specialized ML model was trained using a method comprising:
  (i) providing a pre-trained ML model;
  (ii) training said pre-trained ML on a uniquely ordered first set of retinal images to produce a trained ML model, wherein for each of said first set of images, providing a corresponding information item relating to a first predefined type, so as to be able to predict said corresponding information item of said predefined type for new retinal images; and
  (iii) training said trained ML model on a uniquely ordered second set of retinal images including images of healthy and pre-clinical retinas to produce said specialized ML model,
  wherein said specialized ML model is able to provide prediction data as to whether or not said at least one retinal image is indicative of the malady manifesting or progressing in the retina over said time-period.

* * * * *